United States Patent [19]

Nakajima et al.

[11] 4,293,085

[45] Oct. 6, 1981

[54] TONER FEEDING DEVICE

[75] Inventors: Shunichi Nakajima, Yokohama; Haruyoshi Hasegawa, Matsudo, both of Japan

[73] Assignee: Tokyo Shibaura Denki Kabushiki Kaisha, Kawasaki, Japan

[21] Appl. No.: 47,930

[22] Filed: Jun. 12, 1979

[30] Foreign Application Priority Data

Sep. 14, 1978 [JP] Japan .......................... 53-126221[U]
Sep. 14, 1978 [JP] Japan .......................... 53-126222[U]
Sep. 14, 1978 [JP] Japan .......................... 53-126223[U]

[51] Int. Cl.³ .................... B65D 88/54; G01F 11/42
[52] U.S. Cl. .................................. 222/311; 222/407; 222/DIG. 1; 355/3 DD
[58] Field of Search ........... 355/3 R, 3 DD; 118/651, 118/653, 656, 657, 658, 661; 222/DIG. 1, 414, 311, 407

[56] References Cited

U.S. PATENT DOCUMENTS

| Re. 27,876 | 1/1974 | Hudson et al. ..................... 222/181 |
| 3,448,724 | 6/1969 | Chawda et al. ............ 355/3 DD X |
| 3,572,922 | 3/1971 | Olden ............................. 118/657 X |
| 3,669,072 | 6/1972 | Reynolds et al. ..................... 118/657 |
| 3,724,422 | 4/1973 | Latone et al. ....................... 118/658 |
| 4,133,459 | 1/1979 | Forward ................... 222/DIG. 1 X |
| 4,135,642 | 1/1979 | Forward et al. ......... 222/DIG. 1 X |
| 4,188,907 | 2/1980 | Lipani ................................ 118/657 |

FOREIGN PATENT DOCUMENTS 52-45238 10/1977 Japan .

Primary Examiner—Fred L. Braun
Attorney, Agent, or Firm—Cushman, Darby & Cushman

[57] ABSTRACT

A toner feeding device comprising a toner box having a toner outlet port formed at the bottom, a roller housed in the toner box in a manner to close the toner outlet port, and a toner catching plate biting the roller. The roller is formed of a porous elastic material and the toner catching plate is slidable such that the toner feeding rate can be controlled by suitably adjusting the position of the slidable toner catching plate.

13 Claims, 11 Drawing Figures

TONER FEEDING DEVICE

BACKGROUND OF THE INVENTION

This invention relates to a roller type toner feeding device for an electrophotographic copying machine.

Accompanying FIG. 1 shows a conventional toner feeding device. It is seen that the device comprises a toner box 2 having a toner outlet port 1 formed at the bottom, a roller 3 formed of a porous elastic material and housed in the toner box 2 in a manner to close the toner outlet port 1, and a toner catching plate 4 extending upward from below the roller 3 to bite the surface region of the foller 3. Particles of toner 5 housed in the toner box 2 enter the pores of the porous elastic roller 3 and are transferred to the toner outlet port 1 in accordance with rotation of the roller 3. Upon reaching the toner outlet port 1, the toner is caught by the toner catching plate 4 biting the roller 3 so as to feed the toner into a developing device (not shown). The roller is rotated in clockwise direction. In the conventional device shown in FIG. 1 the toner feeding rate is controlled by suitably adjusting the angle of rotation of the roller 3. A serious difficulty accompanying the above-mentioned technique of controlling the toner feeding rate is that the rotation angle of the roller must be manually adjusted every time a single copy is reproduced. Otherwise, it is impossible to supply a proper amount of toner in reproducing succeeding copies, failing to obtain clear copies.

In order to overcome the difficulty mentioned above, it has been proposed to make the toner catching plate 4 movable so that the biting degree of the toner catching plate into the elastic roller 3 may be adjusted for controlling the toner feeding rate. This idea is certainly interesting. But, the toner catching plate 4 employed in the conventional device has a smooth upper plane 6 as shown in FIG. 2. In this case, a sharp change is caused in the toner feeding rate where the biting amount of the toner catching plate into the roller varies within a very narrow range of 0 to 0.5 mm as shown in FIG. 3. In addition, the toner feeding rate remains substantially constant if the biting amount mentioned exceeds 0.5 mm. Naturally, an extremely high precision is required for manufacturing and mounting the roller and the toner catching plate. In addition, the operator must adjust very accurately the biting amount of the toner catching plate into the roller for controlling the feeding rate satisfactorily.

SUMMARY OF THE INVENTION

An object of this invention is to provide a toner feeding device capable of readily adjusting the toner feeding rate. The device according to this invention comprises a toner catching plate of an improved shape, rendering it possible to feed the toner very stably at a desired rate.

DETAILED DESCRIPTION OF THE INVENTION

Figure 4:
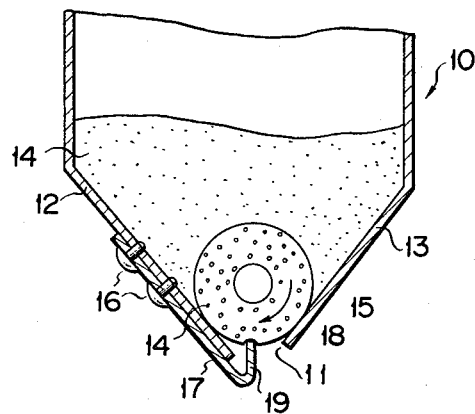
FIG. 4 is a cross sectional view showing the toner feeding device according to one embodiment of this invention.

As shown in FIG. 4, the toner feeding device according to one embodiment of this invention comprises a toner box 10 having a toner outlet port 11 formed at the bottom. It is seen that the side plates 12, 13 of the toner box 10 are inclined toward the toner outlet port 11 so as to facilitate the movement of a toner 14 housed in the box 10 toward the toner outlet port 11. A roller 15 formed of a porous elastic material is mounted in the toner box 10 in a manner to close the toner outlet port 11.

Figure 5:
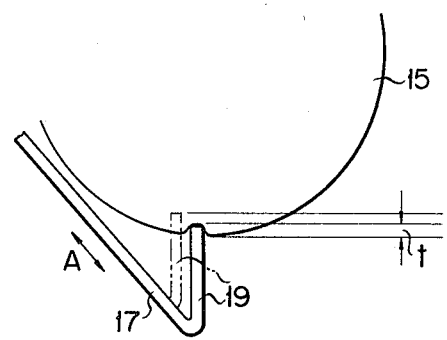
FIG. 5 is a sketch showing how the toner catching plate bites the roller in the device of FIG. 4.

It is important to note that a slidable plate 17 is mounted to the side plate 12 by using screws 16. Further, a toner catching plate 19 biting the surface region of the elastic roller 15 is fixed to the lower end of the slidable plate 17. As described later, the upper plane 18 of the toner catching plate 19 is provided with projections of particular shapes and arrangements. The biting amount "t" (FIG. 5) of the toner catching plate 19 into the surface region of the roller 15 is adjusted by sliding the plate 17 along the ride plate 12 of the toner box 10 as denoted by an arrow A in FIG. 5.

Figure 6:
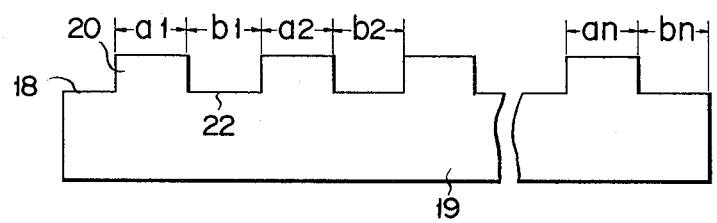
FIGS. 6, 7 and 9 show different shapes of the toner catching plate used in the device of FIG. 4.
Figure 7:
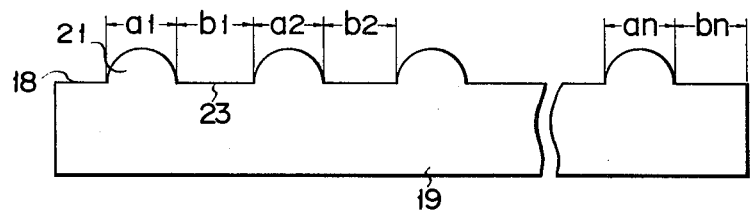

Each of FIGS. 6 and 7 shows the shape of the upper plane 18 of the toner catching plate 19. Specifically, the upper plane 18 in the embodiment of FIG. 6 is provided with projections 20 of rectangular shape in cross section which are formed a predetrmined distance apart from each other in the axial direction of the roller 15. Likewise, projections 21 of semi-circular shape in cross section are formed in the embodiment of FIG. 7. Naturally, provision of these projections 20 and 21 results in the formation of recesses 22 and 23, respectively, as seen from the drawings. The toner carried by the roller 15 is caught by these projections 20 and 21, but the recesses 22 and 23 do not serve to catch the toner. If follows that the toner feeding rate and the toner distribution in the axial direction of the roller 15 can be controlled as desired by properly selecting the widths $a_1, a_2...a_n$ of the projections 20, 21 and the widths $b_1, b_2...b_n$ of the recesses 22, 23. Incidentally, each of the widths $a_1, a_2...a_n$ is set at 4 mm and each of the widths $b_1, b_2...b_n$ at 6 mm in the embodiments of FIGS. 6 and 7. It is important to determine the width of the recess such that the toner caught by the projection to fall into a developing device, not shown, does not form a stripe pattern on the developed copy. Naturally, the developed copy does not bear a stripe pattern of toner if the width of the recess is set at about 6 mm.

Figure 8:
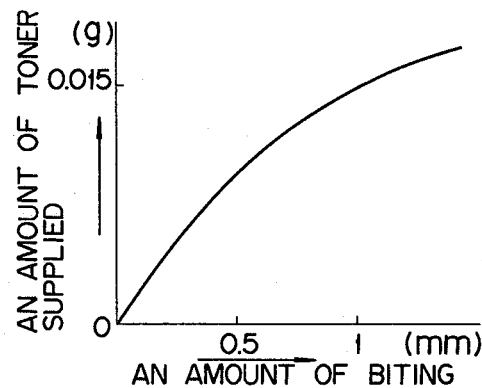
FIG. 8 is a graph showing the relationship between the toner feeding amount and the biting amount of the toner catching plate into the roller in the device of this invention.

The toner 14 housed in the toner box 10 is carried to the toner outlet port 14 in accordance with the rotation of the porous elastic roller 15. Upon reading the toner outlet port 14, the toner is caught by the projection 20 or 21 of the toner catching plate 19 so as to be fallen into the developing device. If the toner feeding rate is higher than the desired toner consumption in the developing device, the slidable plate 17 is moved obliquely downward by loosening the screw 16 so as to decrease the biting amount "t" of the toner catching plate 19 into the elastic roller 15. On the other hand, the slidable plate 17 is moved obliquely upward so as to increase the biting amount "t" if the initially set toner feeding rate is lower than the desred toner consumption in the developing device. To be brief, the desired toner feeding rate can be easily achieved by adjusting the biting amount "t". It is important to note that the change in the toner feeding rate with the biting amount is moderate in this invention as shown in FIG. 8. It follows that the desired toner feeding rate can be achieved without difficulty.

Figure 10:
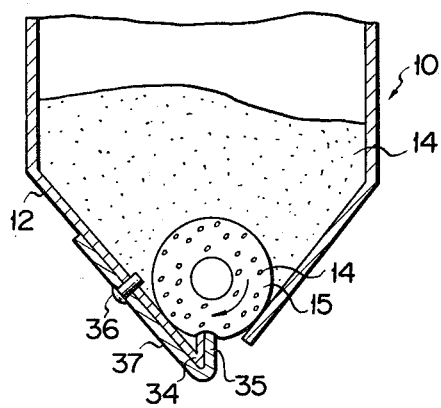
FIG. 10 is a cross sectional view showing the toner feeding device according to another embodiment of this invention.
Figure 11:
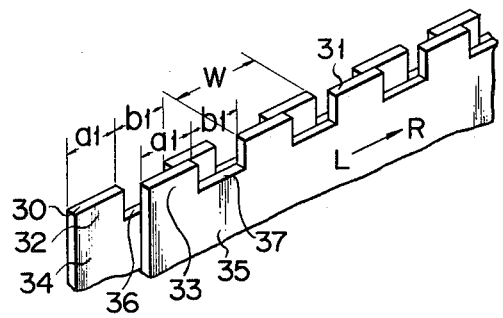
FIG. 11 is an oblique view showing the toner catching plate used in the device of FIG. 10.

FIGS. 10 and 11 jointly show another embodiment of this invention in which a plurality of toner catching plates are superposed for controlling the toner feeding rate. Specifically, first and second toner catching plates 34 and 35 having projections 32, 33 formed on the upper planes 30, 31, respectively, are mounted in a superposed fashion as shown in the drawings. It is seen that the first plate 34 is fixed to the lower end of the bottom plate 12 of the toner box 10 in a manner to stand upright. Naturally, the projection 32 formed at the upper plane 30 of the first plate 34 is allowed to bite the surface region of the elastic roller 15. On the other hand, the second plate 35 is provided in a manner to stand upright from the lower end of a slidable plate 37 which is mounted to the bottom plate 12 of the toner box 10 by a screw 36. It should be noted that the plate 37 to which is fixed the second toner catching plate 35 is slidable in the axial direction of the roller 15. In this embodiment, the toner feeding rate can be adjusted by suitably sliding the second plate 35 relative to the first plate 34 as readily seen from FIG. 11. Specifically, the degree of overlapping between the projections 32 and 33 of the first and and second toner catching plates 34 and 35, respectively, can be adjusted by sliding the second plate 35 so as to provide an optimum width W of the effective toner catching portion of the superposed structure. Incidentally, the first toner catching plate 34, which is fixed to the bottom plate 12 of the toner box 10 in the embodiment of FIGS. 10 and 11, can also be made slidable as the second plate 35.

If the actual toner feeding rate is higher than the desired toner consumption, the second toner catching plate 35 is moved by loosening the screw 36 in the direction of R as shown in FIG. 11 so as to decrease the width W of the effective toner catching portion. In contrast, the second plate 35 is moved in the direction of L so as to increase the width W if the toner feeding rate is lower than the desired toner consumption. Since the width W is adjusted by moving the second plate 35, the toner feeding rate can be adjusted very accurately in the embodiment of FIGS. 10 and 11. Incidentally, each of the width $a_1, a_2...a_n$ of the projections 32 and 33 shown in FIG. 11 is set at 4 mm. On the other hand, each of the widths $b_1, b_2...b_n$ of the recesses 36 and 37 should be 10 mm or less, preferably, about 6 mm.

Figure 9:
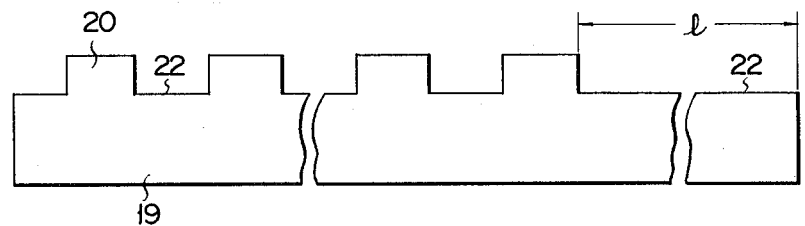

In the embodiments shown in the accompanying drawings, a plurality of projections serving to catch the toner are formed apart from each other over the entire length of the toner catching plate. However, some of the projections may be omitted as shown in FIG. 9 in accordance with the width of the effective area of the original so as to prevent the waste of the toner 14. In FIG. 9, a projection is not formed on the right-hand portion of the toner catching plate 19 so as to provide a recess having a width "l". Further, the projections mentioned above are rectangular or semi-circular shape in cross section in the embodiments described above. But, it is possible to form projections of any shape, provided the area of the projection effective for catching the toner varies in accordance with the change in biting amount of the toner catching plate into the porous elastic roller.

Figure 1:
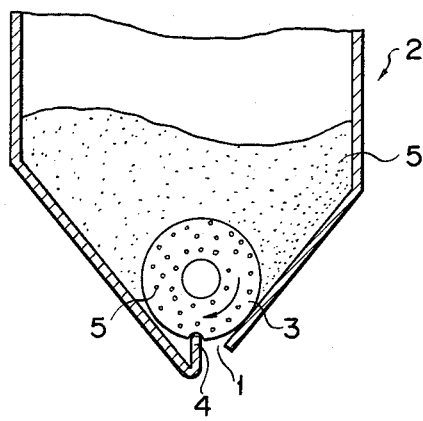
FIG. 1 is a cross sectional view showing a conventional toner feeding device.
Figure 2:
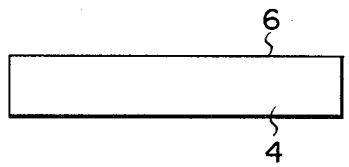
FIG. 2 shows the toner catching plate used in the device of FIG. 1.
Figure 3:
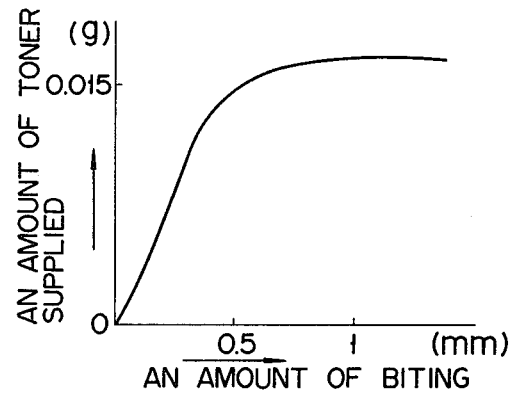
FIG. 3 is a graph showing the relationship between the toner feeding amount and the biting amount of the toner catching plate into the elastic roller in the device of FIG. 1.

As described in detail, the toner feeding device of this invention comprises a toner catching plate having a plurality of projections formed apart from each other on the upper plane thereof. Because of this construction, the change in the toner feeding rate is made substantially proportional to the change in the biting amount of the toner catching plate into the surface region of the roller as shown in FIG. 8. Further, the change in the toner feeding rate is relatively moderate. Still further, the toner feeding rate can be changed in the region where the biting amount mentioned above far exceeds 0.5 mm unlike the conventional case shown in FIG. 3. It follows that the device of this invention is free from the difficulties accompanying the conventional devices and permits controlling the toner feeding rate very accurately and easily. Also, the upper and lower planes of the toner catching plate may be formed in parallel with each other.

What we claim is:

1. A toner feeding device comprising:
   a toner box having a toner outlet port formed at the bottom thereof;
   a roller housed in the toner box in a manner to close the toner outlet port;
   said roller being formed of a porous elastic material and serving to carry the toner housed in the toner box to the toner outlet port;
   a toner catching plate engageable with said roller so as to bite a surface region of said roller so as to free toner from the pores thereof, said toner catching plate being mounted on a slidable member such that its degree of engagement with said roller is adjustable to control the flow of toner; and
   at least a second toner catching plate, the biting edges of said toner catching plates being superimposed on one another.

2. The device according to claim 1, wherein each toner catching plate includes a plurality of toner catching portions formed apart from each other in the axial direction of the roller, said toner catching portions biting the surface region of the roller so as to catch the toner carried by the roller to the toner outlet port.

3. The device according to claim 2, wherein the toner catching portion is a projection formed on the upper plane of the toner catching plate.

4. The device according to claim 3, wherein the projection is rectangular shape in cross section.

5. The device according to claim 3, wherein the projection is semi-circular shape in cross section.

6. The device according to claim 1, wherein one of the toner catching plates is slidable in the axial direction of the roller such that the length of the toner catching portion of the toner catching plate in the axial direction of the roller can be controlled by sliding the slidable toner catching plate.

7. A toner feeding device commprising:

a toner box having a toner outlet port formed at the bottom thereof;

a roller formed from a porous elastic material housed in the toner box in a manner to close the toner outlet port, for carrying toner from the toner box to the toner outlet port; and a toner catching plate engageable with said roller so as to bite a surface region thereof so as to free toner from the pores thereof, said toner catching plate being mounted on a slidable member such that its degree of engagement with said roller is adjustable to control the flow of toner wherein the toner catching plate includes a plurality of toner catching portions formed apart from each other in the axial direction of the roller, said toner catching portions biting the surface region of the roller so as to catch the toner carried by the roller to the toner outlet port, and the length of the toner catching portion in the axial direction of the roller, the distance between two adjacent toner catching portions operatively determining a toner feeding rate for the device in accordance with the ratio of A:B wherein A represents the length of the toner catching portion in the axial direction of the roller and B denotes the distance between two adjacent toner catching portions.

8. The device according to claim 7, wherein the toner catching portion is a projection formed on the upper plane of the toner catching plate.

9. The device according to claim 8, wherein the projection is rectangular shape in cross section.

10. The device according to claim 8, wherein the projection is semi-circular shape in cross section.

11. The device according to claim 8, wherein the width of the projection is 4 mm and the distance between two adjacent projections is 6 mm.

12. The device according to claim 7, wherein the toner catching portions are provided to cover the effective width of the roller.

13. The device according to claim 7, wherein the upper and lower planes of the toner catching plate are parallel with each other.

* * * * *